United States Patent [19]

Slifka

[11] Patent Number: 5,207,361
[45] Date of Patent: May 4, 1993

[54] EASILY DETACHABLE CARRIER ATTACHMENT FOR A VEHICLE

[76] Inventor: Walter F. Slifka, P.O. Box 212, Minersville, Pa. 17954

[21] Appl. No.: 834,079

[22] Filed: Feb. 12, 1992

[51] Int. Cl.⁵ .......................... B62J 9/00; B62J 11/00
[52] U.S. Cl. .................... 224/39; 224/32 R; 224/274; 224/42.45 R; 224/42.39; 248/96; 248/310
[58] Field of Search .............. 224/39, 32 R, 42.39, 224/42.43, 42.45, 42.33, 42.32, 41, 274, 901; 248/310, 96

[56] References Cited

U.S. PATENT DOCUMENTS

| | | |
|---|---|---|
| 597,318 | 1/1898 | Jenks ................... 224/39 R |
| 1,475,605 | 11/1923 | Smith ................... 224/42.39 |
| 1,683,169 | 9/1928 | De Noya ............... 224/42.39 |
| 2,822,969 | 2/1958 | Cooper ................. 224/42.39 X |
| 2,908,510 | 10/1959 | Lossau . |
| 3,286,891 | 11/1966 | Jones, Jr. . |
| 3,355,210 | 11/1967 | Cripe .................... 224/42.43 X |
| 3,666,221 | 5/1972 | Schilz .................... 248/96 |
| 3,938,719 | 2/1976 | Carlton ................ 224/32 R X |
| 4,118,002 | 10/1978 | Bartlett ................. 248/310 X |
| 4,355,746 | 10/1982 | Casady ................ 224/42.45 R X |
| 4,393,986 | 7/1983 | Sirey ..................... 224/32 R X |
| 4,533,013 | 8/1985 | Hightower ........... 224/274 X |
| 4,981,243 | 1/1991 | Rogowski .............. 224/41 |
| 5,005,661 | 4/1991 | Taylor et al. .......... 224/41 X |

Primary Examiner—Allan N. Shoap
Assistant Examiner—Paul A. Schwarz
Attorney, Agent, or Firm—Kenyon & Kenyon

[57] ABSTRACT

A golf bag carrier for a motorcycle which is designed for easy attachment and detachment. The carrier includes a support plate with an attached tubular member. The tubular member is used to secure the support plate to the motorcycle by sliding it over the motorcycle foot peg and securing it with a bolt. The golf bag is secured to the support plate through the use of flexible "bungee cord" devices, one end connected to securement holes attached to the support plate and the other end to the golf bag itself. The golf bag may be further secured laterally by another bungee cord connected to the motorcycle. The carrier is easy to attach and detach, and does not require that the motorcycle itself be altered in any way. The carrier may also be used on motorscooters, bicycles, and other small vehicles.

16 Claims, 2 Drawing Sheets

EASILY DETACHABLE CARRIER ATTACHMENT FOR A VEHICLE

BACKGROUND OF THE INVENTION

1 Field of the Invention

The present invention relates to a device for transporting a golf bag on a vehicle.

2. Background

Previous inventors have devised arrangements for transporting golf equipment bags on a motorcycle. For example, in U.S. Pat. No. 2,908,510 a motorcycle is described in which a metal frame extending from below the seat to an area in front of the handle bars is used to support a golf bag. The golf bag in this arrangement is carried between the rider's legs and extends up through the handlebars of the motorcycle. There are many disadvantages to the arrangement described in this patent. First, the arrangement requires that the motorcycle body and handlebars be designed specifically to accommodate the golf bag frame; the invention in this patent would not work on a conventional motorcycle frame. Furthermore, the manner in which the golf bag extends upwards through the handlebars and into the driver's line of sight can be dangerous.

U.S. Pat. No. 3,286,891 discloses another arrangement for transporting a golf bag on a motorcycle. In this invention, a frame is mounted to the rear of the motorcycle, to which the golf bag is removably attached. The frame is attached to the motorcycle at two points: the rear portion of the luggage carrier and the fender mount for the taillight and license plate. Although the device of this invention is adapted to fit on a conventional motorcycle frame, it is disadvantageous in that the rear taillight and license plate must be removed from the fender and attached to the golf bag frame every time the golf bag frame is attached. Furthermore, every time the golf bag frame is removed, the taillight and license plate must be removed from the frame and reattached to the fender. This process of attaching and detaching is cumbersome if it is desired to use the motorcycle without the golf bag frame between trips to the golf course. This invention has the further disadvantage of not being usable on motorcycles without a luggage rack, or on motorcycles which have the taillight and license plate holder mounted above the fender. Furthermore, neither of the above inventions is adaptable for use on other vehicles, such as bicycles.

SUMMARY OF THE INVENTION

The present invention overcomes the problems in the above prior art devices by incorporating an easily detachable mounting structure that does not require that any part of the structure of the vehicle be altered. Furthermore, the device of the present invention is designed such that it can be used on all types of motorcycle frames and can also be used on other small vehicles. The device is also designed so that it may carry other equipment besides a golf bag.

According to the present invention, there is provided a carrier device for a vehicle comprising:

1) a planar support member,
2) a means for attaching the planar support member to a vehicle, and
3) a means for attaching the bag to the support.

The present invention may be more fully understood from the description of the preferred embodiments of the invention set forth below, together with the accompanying drawings.

DESCRIPTION OF THE PREFERRED EMBODIMENT

Figure 1:
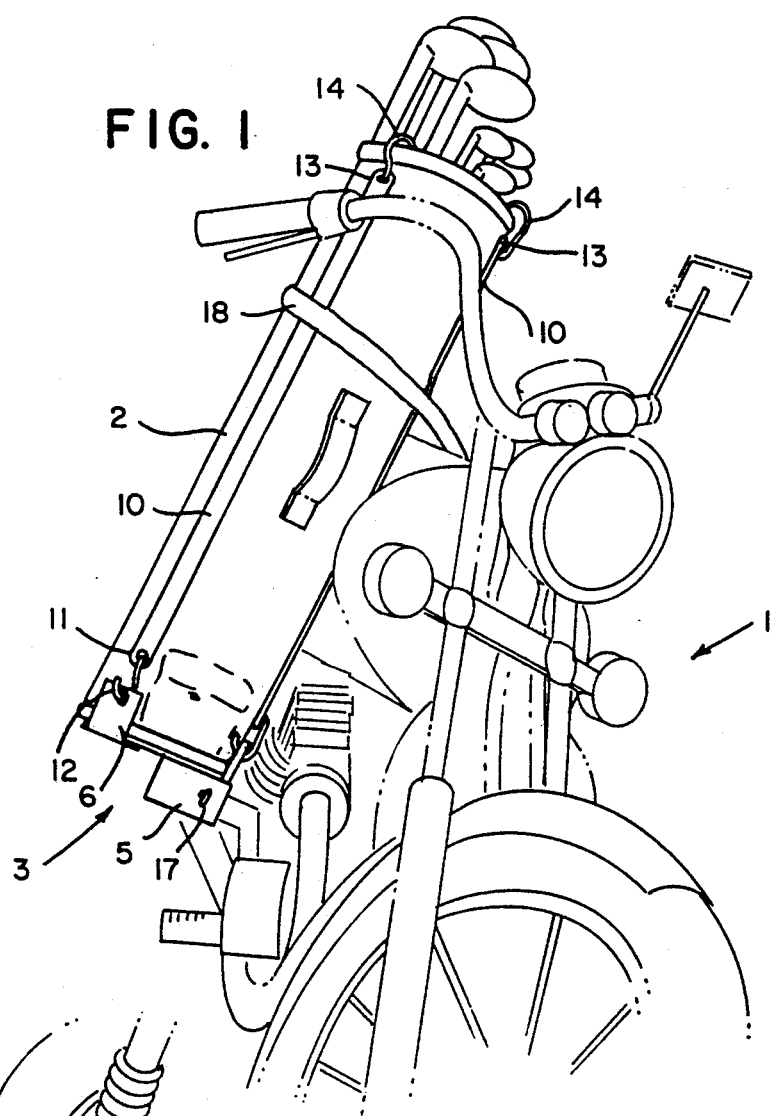
FIG. 1. is a perspective view of a conventional motorcycle with an attached golf bag carrier holding a golf bag.
Figure 2:
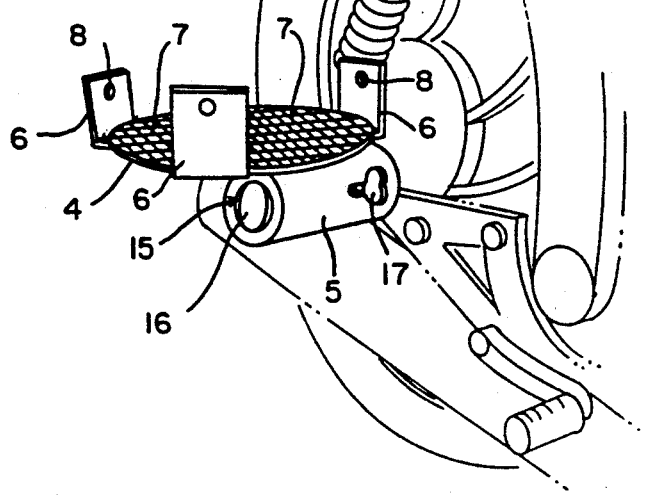
FIG. 2 is a perspective view of the golf bag carrier mounted on the motorcycle without an attached golf bag.
Figure 3:
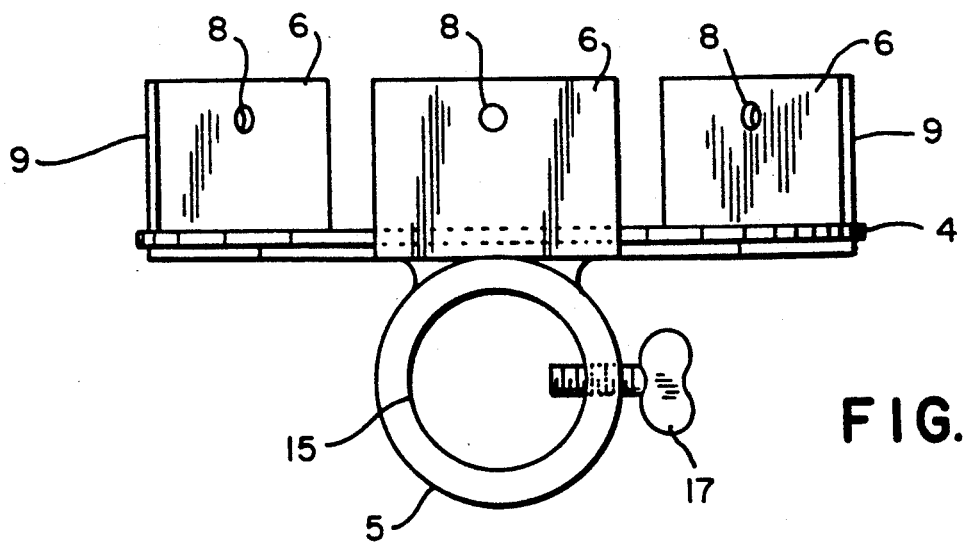
FIG. 3 is a side view of a golf bag carrier frame.
Figure 4:
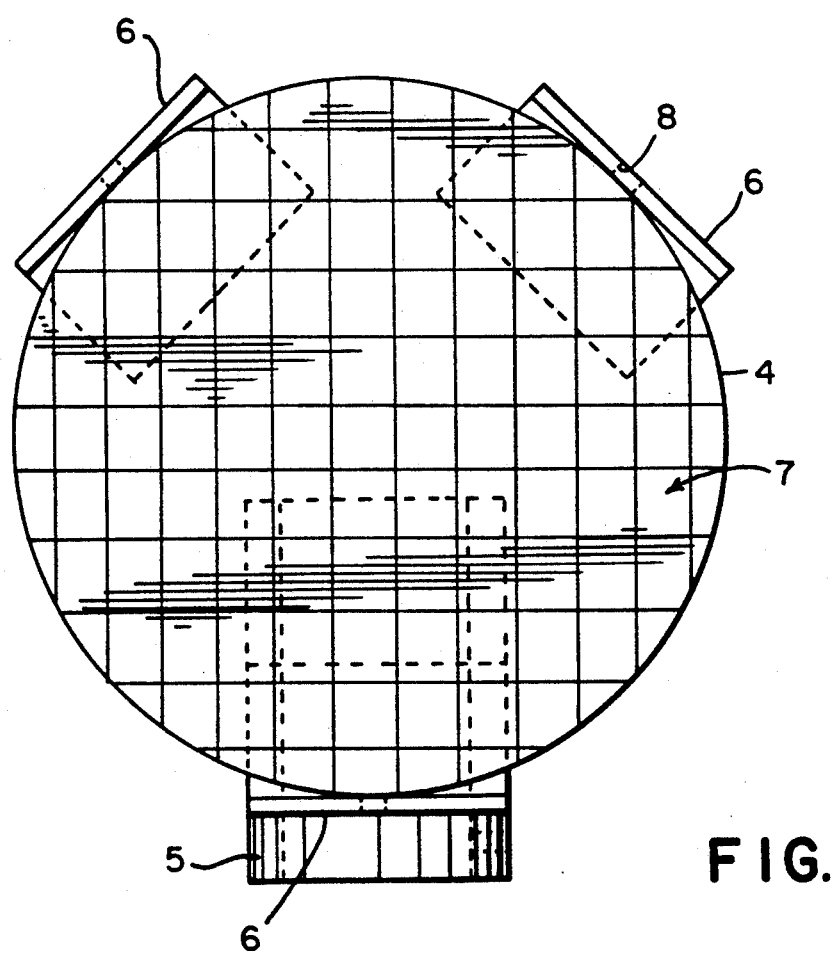
FIG. 4 is a top view of a golf bag carrier frame.

Referring to FIG. 1, reference numeral 1 designates a motorcycle, 2 a golf bag, and 3 designates a golf bag carrier mounted on the motorcycle 1 for transporting golf bag 2.

Golf bag carrier 1 is comprised of a support section 4, attachment mechanism 5, and lateral support members 6. In the preferred embodiment, the support section 4 is constructed as a flattened disc, with a radial dimension slightly larger than that of the radial dimension of a conventional golf bag 2. Support section 4 is designed to support the bottom of golf bag 2 for transportation. Although shown as circular in shape, the support section could also be constructed in a rectangular or hexagonal shape, in order to accommodate a variety of different articles for transportation. Support section 4 may be equipped with traction extensions or ridges 7, which provide additional lateral support for the golf bag 2 when it is mounted in the carrier 3.

Mounted on support section 4 are lateral support members 6. In the preferred embodiment, lateral support members 6 consist of three right-angle sections fixedly attached to the support section 4 at equal angles and projecting up perpendicularly to the surface of support section 4. Lateral support members 6 could also be constructed as a unitary lip extending around the entire periphery of support section 4. Lateral support members 6 provide support for preventing lateral motion of the golf bag 2 while it is in transport.

Lateral support members 6 have securement holes 8 provided on the upwardly-extending portion 9. Securement holes 8 are designed to accommodate one end of expandable securement devices 10. In the preferred embodiment, expandable securement devices 10 are flexible "bungee cords." However, expandable securement devices 10 could also consist of one or more of the following: adjustable straps, ropes, chains, or a rod-turnbuckle combination. The bottom end 11 of expandable securement device 10 has an engagement device 12 designed to removably attach it to securement holes 8. The upper end 13 of expandable securement device 10 has an engagement device 14 which is used to removably attach it to golf bag 2. The combination of securement holes 8 and expandable securement devices 10 serve to removably attach golf bag 2 to carrier 3.

Attachment mechanism 5 is fixedly mounted to vertical support member 4. In the preferred embodiment, attachment mechanism 5 is a tubular member 15 designed to ensheathe the foot peg 16 of motorcycle 1. Attachment mechanism 5 is provided with an adjustable securement device 17 for removably securing the carrier 3 to motorcycle 1. In the preferred embodiment, adjustable securement device 17 is a wing bolt inserted through a tapped hole provided in the side of tubular member 15. However, adjustable securement device 17 could consist of any other well-known arrangement for removable attachment.

In use, the motorcycle foot peg 16 would first be extended to its unretracted position. The attachment mechanism 5 would then be connected to the foot peg 16. This would be accomplished by unscrewing adjustable securement device 17 until tubular member will slide over foot peg 16. Adjustable securement device 17 is then tightened until the attachment mechanism 5 is fixedly secured to foot peg 16. Golf bag 2 would then be placed on top of vertical support section 4. Expandable securement devices 10 would be used to secure the golf bag 2 to attachment mechanism 5 by securing one end 11 through securement hole 8 and the other end 13 to bag 2. Finally, to achieve enhanced lateral support, another expandable securement device 18 can be passed around the golf bag horizontally, and both ends 19, 20 can be secured to the body of motorcycle 1.

It is to be understood that attachment mechanism 5 is not limited to use on motorcycles, but could be used on other vehicles, including, but not limited to, motor-scooters and bicycles. Furthermore, the shape of attachment mechanism is such that any variety of other objects can be carried by it and is not limited to transportation of golf clubs. While the invention has been described by reference to a specific embodiment chosen for purposes of illustration, it should be understood that numerous modifications could be made thereto by those skilled in the art without departing from the basic concept and scope of the invention.

I claim:

1. A carrier device for a vehicle comprising:
a planar support member;
an attachment element fixed to the planar support member, wherein the attachment element is adapted to detachably connect the planar support member to the vehicle without the necessity of altering the vehicle or removing parts from the vehicle, wherein the attachment element comprises a tubular member, said tubular member being adapted to ensheathe a horizontally-extending foot peg to thereby hold said planar support member to said foot peg in a generally horizontal position;
a securement element, said securement element comprising at least one flange extending from the planar support member and a hole passing through said at least one flange;
and an adjustable securement device having one end removably attachable to said securement element and having another end removably attachable to an object to be carried by said easily detachable carrier device, to thereby restrain the object against vertical movement.

2. A carrier device according to claim 1 wherein the tubular member has a securing bolt passing through a wall in the tubular member.

3. A carrier device according to claim 2 wherein the securing bolt is a wing bolt.

4. A carrier device according to claim 1 wherein said at least one flange extends perpendicularly up from the planar support member.

5. A carrier device according to claim 1 wherein said at least one flange comprises a plurality of flanges spaced equiangularly around the perimeter of the planar support member.

6. A carrier device according to claim 1 wherein the adjustable securement device is expandable.

7. A carrier device according to claim 1 wherein the adjustable securement device is elastic.

8. A carrier device according to claim 1 wherein the adjustable securement device has a hook on said one end adapted to fit into said hole.

9. A carrier device according to claim 8 wherein there are a plurality of adjustable securement devices.

10. A carrier device according to claim 8 wherein said another end of the adjustable securement device has a hook.

11. A carrier device according to claim 1 wherein the planar support member has ridges extending upward from a top surface of the planar support member.

12. A carrier device according to claim 1 further comprising an additional adjustable securement device adapted to laterally support the object.

13. A carrier device according to claim 12 wherein the additional adjustable securement device is elastic.

14. A carrier for a two-wheeled vehicle comprising:
a substantially flat plate for supporting the bottom of an object to be carried;
L-shaped brackets fixedly attached around the perimeter of the substantially flat plate, each of said L-shaped brackets having one end extending upwards from said substantially flat plate;
a securement hole in each of the L-shaped brackets in said one end extending upwards from said substantially flat plate;
a tubular attachment device fixedly attached to a bottom of the substantially flat plate, wherein the tubular attachment device is adapted to slide over a foot peg on a two-wheeled vehicle;
an adjustable securing bolt passing through a side wall of the tubular attachment device for detachably securing the tubular attachment device to the foot peg;
expandable securement devices each having one end formed with a hook member to detachably connect each said expandable securement device to the securement hole in the L-shaped bracket, and having another end formed with a hook member to detachably connect each of the expandable securement devices to an object to be transported and;
an additional expandable securement device adapted to pass around the object and formed with hook members at both ends to detachably connect the additional expandable securement device to the motorcycle and to support the object to be transported against lateral movement.

15. A carrier according to claim 14 wherein the expandable securement devices and the additional expandable securement devices are elastic.

16. A golf bag carrier for a motorcycle comprising:
a flat plate;
L-shaped flanges fixed equiangularly around the perimeter of the flat plate, the L-shaped flanges each having one end extending perpendicularly to a top surface of the flat plate;
a hole passing through said one end of each said L-shaped flange;
a tubular attachment member fixed to an underside of the flat plate, the tubular member being shaped to ensheathe a foot peg on said motorcycle;
a securement bolt passing through a tapped hole in a side wall of the tubular attachment member, said securement bolt adapted to detachable fixedly connect said tubular member to said foot peg;

elastic cords having opposing ends, each said cord having a hook on one end of said opposing ends shaped to pass through the hole in each said L-shaped flange and having a hook on the other end of said opposing ends for connecting to the golf bag;

another elastic cord having opposing ends, said another cord having a hook on each of said opposing ends, said another cord having a length sufficient to pass horizontally around a golf bag and allow each of the hooks on said opposing ends of said another elastic cord to attach to the motorcycle.

* * * * *